Dec. 25, 1945.   R. M. WILMOTTE   2,391,532
DIRECT CURRENT AMPLIFIER
Filed May 15, 1944
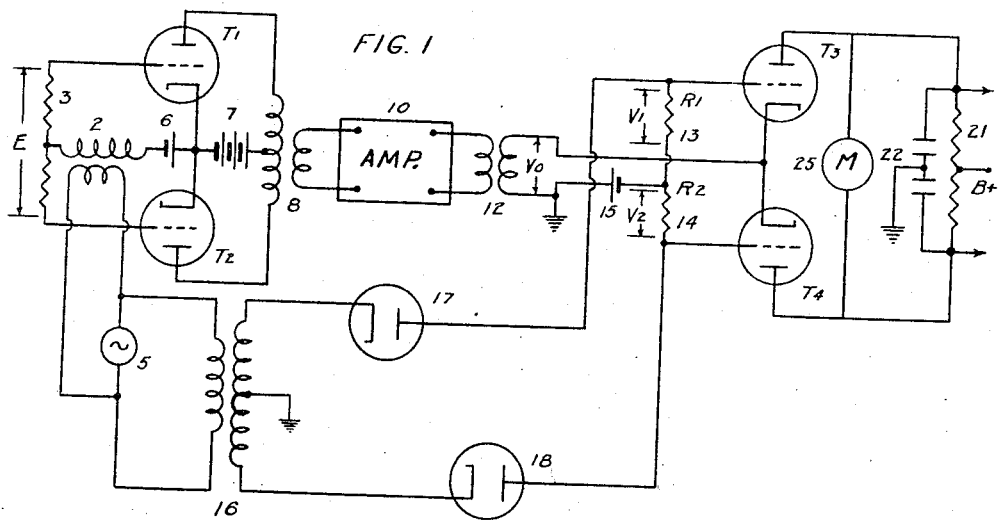
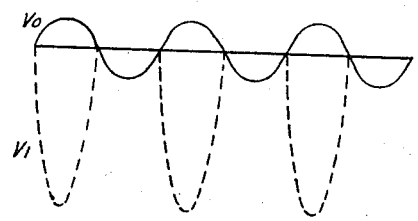
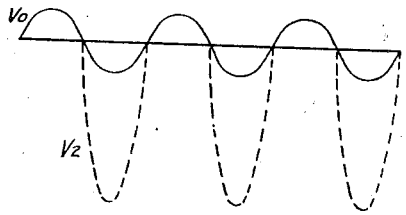
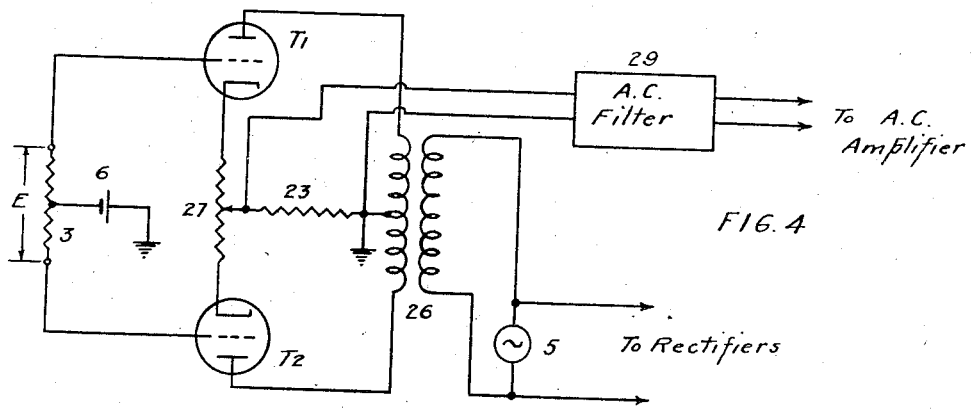
Inventor
Raymond M. Wilmotte Patented Dec. 25, 1945

2,391,532

UNITED STATES PATENT OFFICE 2,391,532

DIRECT CURRENT AMPLIFIER

Raymond M. Wilmotte, Washington, D. C.

Application May 15, 1944, Serial No. 535,764

10 Claims. (Cl. 171—95)

This invention relates to amplifiers for direct current or slowly varying current, and means for measuring direct or slowly varying currents and voltages.

A primary object of my invention is to provide a D. C. amplifier which is substantially independent of variations of the battery voltages.

A further object of this invention is to provide an amplifier capable of amplifying either alternating or direct current voltages without any modifications of the circuit.

Another object of this invention is to provide a means for measuring direct or slowly varying currents and voltages.

The invention will be more fully understood from the following description and the drawing, in which:

Figure 1 is a schematic representation of one embodiment of my invention,

Figures 2 and 3 are diagrams illustrating the operation of the circuit in Figure 1, and Figure 4 is a modification of the invention illustrated in Figure 1.

Referring to the drawing, Figure 1 shows a pair of electron tubes T1 and T2 which may be in the same envelope, having cathodes, control grids, and anodes. A center-tapped resistor 3 is connected between the control grids, and the secondary of an input transformer 2 and a biasing battery 6 are connected from the center tap to the cathodes. A source of alternating voltage 5 is connected across the primary of transformer 2 and impresses a voltage on both control grids in like phases, while a signal voltage E is impressed across the resistor 3. The voltage E may be a D. C. or slowly varying voltage to be amplified, but it is evident it may also be an A. C. voltage. The anodes of tubes T1 and T2 are connected through a pushpull transformer 8 and a plate battery 7 to the cathodes. The output of tubes T1 and T2 is amplified in an A. C. amplifier 10 and cophasally impressed on the control grids of the tubes T3 and T4 through a transformer 12. The A. C. voltage from source 5 is also connected through a transformer 16 to a pair of rectifiers 17 and 18. The output of these rectifiers is impressed across resistors 13 and 14 connected between the control grids of tubes T3 and T4 and ground. A biasing battery 15 is provided to bias tubes T3 and T4 to cutoff. The anodes of tubes T3 and T4 are connected together through a center-tapped resistor 21 and through a source of plate voltage, not shown, to the cathodes. The anodes may be by-passed to ground for alternating current by the condenser 22 and a meter 25 is connected directly across the anodes. It is preferred to use a zero-centered voltmeter at 25 to avoid switching a meter with a single range from one anode to the other in order to read voltages of opposite polarity.

The operation of the circuit shown in Figure 1 can be best understood by referring to Figures 2 and 3. When a voltage is impressed across resistor 3 alternating voltage of the frequency of source 5 is developed in the plate circuit of tubes T1 and T2 and impressed on the control grids of tubes T3 and T4 through transformer 8, amplifier 10, and transformer 12. This alternating voltage on the grids of tubes T3 and T4 is represented by V0 in Figure 2. Simultaneously, rectifier 17 will impress potentials represented by V1 in Figure 2 on the control grid of T3, while rectifier 18 will impress potentials V2, Figure 3, on the control grid of T4. Potentials V1 combine with the alternating potentials V0 as shown in Figure 2 while the potentials V2 combine with the potentials V0 as shown in Figure 3.

It is evident then that the resultant of the potentials V0 and V1 remains negative and that tube T3 therefore remains biased below cutoff and draws no plate current. On the other hand, in Figure 3 the positive half cycles of V0 drive the grid of T4 above cutoff potential and tube T4 consequently draws plate current. Hence, the voltage developed across resistor 21 will represent the magnitude and polarity of the signal voltage E. The voltage across the resistor 21 may be measured by the meter 25. If the meter 25 is sufficiently damped, the condenser 22 may be omitted.

Figure 4 shows a modification of the circuits of tubes T1 and T2. In this modification the alternating voltage from source 5 is differentially applied to the anodes of tubes T1 and T2 through a transformer 26. The cathodes of tubes T1 and T2 are connected together through a potentiometer 27. The movable tap of the potentiometer is connected through a load impedance 23 to ground. The center tap of the secondary of transformer 26 is connected to ground. When a voltage E is applied across the center-tapped resistor 3 in the grid circuit of tubes T1 and T2 an alternating voltage will appear across the load impedance 23 and this will be impressed through a filter 29 on the amplifier 10 in the same manner as in Figure 1. The remainder of the circuit, being the same as in Figure 1, is not duplicated. The load impedance 23 is common to the output and input circuits and hence provides negative feedback; in fact, the circuit is of the cathode follower type. The advantage of the cathode follower circuit is that it has greater freedom from distortion and automatically tends to compensate for changes of the tube characteristics and other variations. The potentiometer 27 provides a means for initially balancing the circuit for a zero-reading of the voltmeter 25.

The voltage source 5 may be a commercial 60 cycle supply or a generator developing a harmonic of 60 cycles, or a source providing any other constant frequency, which may be less than 60 cycles per second or above the audio frequency band, as well as any audio frequency. It has been found desirable in some cases to reduce the plate voltages of tubes T1 and T2 to 25 or 30 volts.

The filter 29 may be incorporated in the amplifier 10. The primary purpose of the filter is to eliminate harmonics of the frequency of the voltage source 5 developed across impedance 23, and to transmit to the amplifier 10 only voltages of the fundamental frequency of the source 5.

One of the chief troubles experienced with D. C. amplifiers is the occurrence of errors due to the drift of battery voltages. It can be seen that the circuits I have invented are substantially free of this trouble and provide a reliable means for amplifying D. C. and slowly varying voltages and measuring the same.

I claim:

1. An amplifier comprising means for impressing a signal voltage thereon, an alternating current source of a given frequency, means for obtaining potentials of the given frequency having an amplitude which varies as the signal voltage, means for producing potential pulses corresponding to each half cycle of said given frequency, means responsive to the frequency potentials and pulses for producing an amplified signal voltage and means for impressing said potentials and pulses on the last named means.

2. In combination a pushpull amplifier including a pair of electron tubes and input and output circuits, means for differentially applying an input voltage to be amplified to said electron tubes, means for cophasally impressing an alternating voltage on said electron tubes, means for producing potential pulses of uniform amplitude corresponding to each half cycle of the alternating voltage, means responsive to said pulses and the alternating voltage output of the pushpull amplifier for producing a voltage substantially proportional to the input voltage.

3. In combination, a pair of electron tubes having control grids, cathodes and anodes, means for differentially applying a signal voltage between the control grids, a circuit from each anode to cathode, means for deriving an alternating voltage output from the anode to cathode circuits, means for obtaining potential pulses of uniform amplitude corresponding to each half cycle of the alternating voltage, means responsive to the alternating voltage output and the pulses for producing a current substantially proportional to the signal voltage.

4. In combination, a pair of electron tubes having control grids, cathodes and anodes, means for differentially applying a signal voltage between the control grids, means for cophasally applying an alternating voltage to the control grids, a pushpull circuit connecting the anodes and cathodes having an alternating voltage output, means for obtaining pulses of negative potential corresponding to each half cycle of the alternating voltage, means responsive to the alternating voltage output and the pulses for producing a current substantially proportional to the signal voltage means for impressing the pulses and alternating voltage output on the last named means.

5. In combination, a pair of electron tubes having control grids, cathodes and anodes, means for differentially applying a signal voltage between the control grids, a circuit from each anode to cathode including an alternating voltage source connected to the anodes differentially, a load impedance connected between said source and the cathodes across which the alternating voltage output of the electron tubes is developed, means for obtaining pulses of negative potential corresponding to each half cycle of the alternating voltage, means responsive to the alternating voltage output and the pulses for producing a current substantially proportional to the signal voltage.

6. In combination, a pair of electron tubes having control grids, cathodes and anodes, means for differentially applying a direct current voltage between the control grids, a circuit from each anode to cathode, means for deriving an alternating voltage output from the anode to cathode circuits, means for amplifying the output voltage, means for obtaining potential pulses corresponding to each half cycle of the alternating voltage, means for combining the amplified output voltage and the pulses and producing a current substantially proportional to the signal voltage.

7. In combination, a pair of electron tubes having control grids, cathodes and anodes, means for differentially applying a signal voltage between the control grids, means for cophasally applying an alternating voltage to the control grids, a pushpull circuit connecting the anodes and cathodes, having an alternating voltage output, means for obtaining pulses of negative potential corresponding to each half cycle of the alternating voltage, a second pair of electron tubes having control grids, cathodes, and anodes, means for amplifying the output voltage and impressing it in like phase on said last mentioned control grids, means for impressing the pulses on said last mentioned control grids alternately, and a pushpull output circuit connected between the anodes and cathodes of said second pair of electron tubes.

8. In combination, a pair of electron tubes having control grids, cathodes and anodes, means for differentially applying a signal voltage between the control grids, an alternating voltage source connected to the anodes differentially, a load impedance connected between said source and the cathodes across which the alternating voltage output of the electron tubes is developed, means for obtaining pulses of negative potential corresponding to each half cycle of the alternating voltage, a second pair of electron tubes having control grids, cathodes, and anodes, means for amplifying the output voltage and impressing it in like phase on last mentioned control grids, means for impressing the pulses on last mentioned control grids alternately, and a pushpull output circuit connected between the anodes and cathodes of the second pair of electron tubes.

9. In combination, a pair of electron tubes having control grids, cathodes and anodes, means for differentially applying a direct current voltage between the control grids, means for cophasally applying an alternating voltage to the control grids, a pushpull circuit connecting the anodes and cathodes having an alternating voltage output, means for obtaining pulses of negative potential corresponding to each half cycle of the first mentioned alternating voltage, a second pair of electron tubes having control grids, cathodes, and anodes, means for amplifying the output voltage and impressing it in like phase on the last mentioned control grids, means for impressing the pulses on the last mentioned control grids alternately, and a resistor connected in pushpull between the last mentioned anodes and cathodes, and a voltmeter connected across a portion of the resistor for measuring the polarity and magnitude of the direct current voltage.

10. In combination, a pair of electron tubes having control grids, cathodes and anodes, means for differentially applying a direct current voltage between the control grids, an alternating voltage source connected to the anodes differentially, a load impedance connected between said source and the cathodes across which the alternating voltage output of the electron tubes is developed, means for obtaining pulses of negative potential corresponding to each half cycle of the alternating voltage, a second pair of electron tubes having control grids, cathodes, and anodes, means for amplifying the output voltage and impressing it in like phase on the last mentioned control grids, means for impressing the pulses on the last mentioned control grids alternately, and a resistor connected in pushpull between the last mentioned anodes and cathodes, and a voltmeter connected across a portion of the resistor for measuring the polarity and magnitude of the direct current voltage.

RAYMOND M. WILMOTTE.